US010512032B2

(12) United States Patent
Jacobson et al.

(10) Patent No.: US 10,512,032 B2
(45) Date of Patent: Dec. 17, 2019

(54) GEOGRAPHICAL RADIO AVAILABILITY AS A SERVICE

(71) Applicant: InstrumentMail, LLC, San Francisco, CA (US)

(72) Inventors: Stuart Alexander Jacobson, San Francisco, CA (US); Vimal Bhalodia, East Hanover, NJ (US)

(73) Assignee: InstrumentMail, LLC, San Francisco, CA (US)

( * ) Notice: Subject to any disclaimer, the term of this patent is extended or adjusted under 35 U.S.C. 154(b) by 0 days.

(21) Appl. No.: 14/841,437

(22) Filed: Aug. 31, 2015

(65) Prior Publication Data

US 2017/0064562 A1    Mar. 2, 2017

(51) Int. Cl.
| | | |
|---|---|---|
| *H04W 88/08* | (2009.01) | |
| *H04W 48/16* | (2009.01) | |
| *H04W 16/18* | (2009.01) | |
| *H04W 64/00* | (2009.01) | |

(52) U.S. Cl.
CPC .......... *H04W 48/16* (2013.01); *H04W 16/18* (2013.01); *H04W 64/00* (2013.01)

(58) Field of Classification Search
CPC ... H04W 88/08; H04W 84/045; H04W 88/06; H04W 28/18; H04W 72/0486; H04L 41/0856; H04L 65/1036; H04L 67/04
See application file for complete search history.

(56) References Cited

U.S. PATENT DOCUMENTS

| | | | | |
|---|---|---|---|---|
| 2002/0022480 | A1* | 2/2002 | Jensen | H04W 16/18 455/423 |
| 2006/0148403 | A1* | 7/2006 | Martin | H04B 3/54 455/41.1 |
| 2007/0185804 | A1* | 8/2007 | Cordoba | G06Q 30/02 705/37 |
| 2009/0059822 | A1* | 3/2009 | Morrill | H04L 41/0806 370/310 |
| 2009/0249163 | A1* | 10/2009 | Ovchinnikov | H03M 13/2972 714/755 |
| 2010/0273509 | A1* | 10/2010 | Sweeney | G06Q 10/02 455/456.3 |
| 2010/0298008 | A1* | 11/2010 | Burroughs | H04W 64/00 455/456.1 |
| 2011/0269467 | A1* | 11/2011 | Leclerc | H04W 48/02 455/436 |
| 2012/0096130 | A1* | 4/2012 | Wei | H04L 12/66 709/219 |

(Continued)

OTHER PUBLICATIONS

Hu, Pan et al., "Laissez-Faire: Fully Asymmetric Backscatter Communication," College of Information and Computer Sciences, University of Massachusetts, presented at SIGCOMM, Aug. 17-21, 2015, London, United Kingdom.

*Primary Examiner* — Quan M Hua
(74) *Attorney, Agent, or Firm* — Polsinelli PC

(57) ABSTRACT

Some methods enable a computer to receive location information from a device and determine a coverage region for the device. The device's coverage region is the area within range of a wireless signal coming from the device. The computer can determine that part of the device's coverage region covers part of a specified region and instruct the device to provide wireless access to a network associated with the first region.

16 Claims, 5 Drawing Sheets

(56) References Cited

U.S. PATENT DOCUMENTS

| | | | |
|---|---|---|---|
| 2012/0164952 A1* | 6/2012 | Lee | H04W 24/08 455/67.11 |
| 2013/0003680 A1* | 1/2013 | Yamamoto | G01S 5/0205 370/329 |
| 2013/0137431 A1* | 5/2013 | Aminaka | H04B 7/155 455/435.1 |
| 2013/0196613 A1* | 8/2013 | Graff-Radford | H04W 4/22 455/404.2 |
| 2013/0226983 A1* | 8/2013 | Beining | H04N 21/252 709/201 |
| 2014/0105007 A1* | 4/2014 | Pathmasuntharam | H04L 12/2856 370/230 |

* cited by examiner

GEOGRAPHICAL RADIO AVAILABILITY AS A SERVICE

BACKGROUND

Many devices today benefit from wireless connections for much of their functionality. When a person travels to a new location with their devices, a common task is establishing a wireless internet connection (e.g., WiFi). Many times, the user cannot find any familiar WiFi connections and must manually connect to a new access point. The user may attempt to connect to various "open" (i.e., unsecured) connections, but these typically lack internet connectivity and, even if they do provide internet access, are slow and fraught with security risks. There may exist a legitimate secured network, but finding the security password can be burdensome. Previous attempts at solving this problem include establishing a network of hotspots that all broadcast the same network name (SSID). However, these hotspots do not provide individualized wireless connections, present security risks (because you share your connection with a potential eavesdropper), and are unable to dynamically adjust to a user's locations and needs.

These limitations are particularly burdensome to corporate users that might desire corporate intranet access to their private network or wish to have branded WiFi at a certain location (e.g., a conference room for a client meeting). Building and configuring a wireless network can be time consuming and complex, which can be especially undesireable if the need for the wireless network is only temporary. For example, a company may send an employee to work in a remote location for a short time and it would be prohibitively expensive to establish a private wireless network for the employee. As an alternative, in order to acquire wireless internet access a remote employee typically must learn about an already available WiFi SSID and password and then establish a virtual private network connection between their device and corporate resources.

Developing a long-term wireless network can also present problems and limitations. Traditionally, radio emitter placement within a city can become a complex ordeal, requiring skilled network engineers to configure and place with meticulous precision. Interference, coverage, power, and cost constraints increase the complexity of provisioning a static system. Further, leasing property, building towers, and overcoming regulatory obstructions can be costly and time consuming. At times, there may be motivation to increase the coverage of an existing wireless network, but adding towers can similarly be inconvenient or expensive. One approach is to permit users to purchase and install "microcells" that connect to the internet via cable. However, these microcell units can interfere with existing wireless signals and are not dynamically configurable.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for provisioning and managing a radio virtual machine.

An example system can have a processor, a radio, and memory. The memory can have instructions that can be executed by the processor to perform a method. The method can include determining the device's location and sending its location over a network. The method can also include receiving configuration data over the network from a server and using the configuration data to configure the radio for another network. The system can then send and receive data from connected devices over this new network.

In some embodiments, the system is housed within a power-strip or similar housing.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
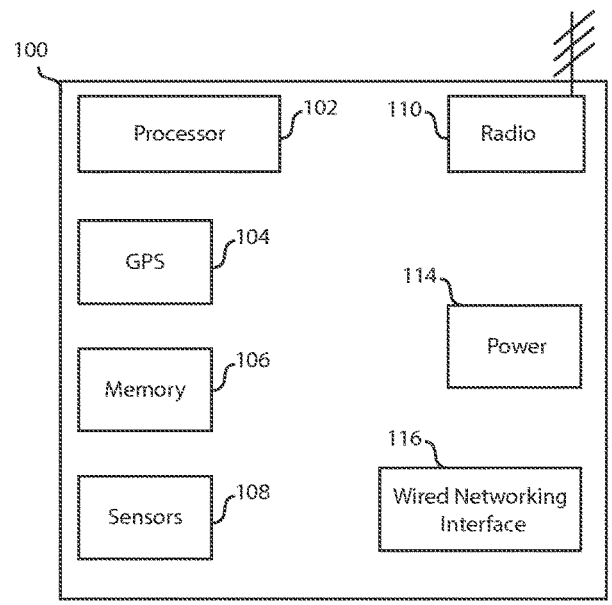
FIG. 1 illustrates an example radio system.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a geographically available radio as a service.

A wireless infrastructure can be established. For example, a company can plan out and install high powered radio towers in strategic locations. Alternatively, individuals might install low powered radio stations without central control or organization (e.g., WiFi). In some embodiments, a wireless infrastructure can be established using a blended approach of centralized control and individual autonomy. A company (institution, person, etc.) can give radio systems 100 to various people or businesses ("hosts") who in turn can set up and install radio systems 100 as they see fit; the company can then manage and optimize the radio systems 100 remotely. In some embodiments, radio system 100 can be provided at minimal cost to the host, which can be strategically chosen based on their location. A host can connect radio system 100 to their power mains and internet connection. Radio system 100 can also contain extra functionality to entice hosts to use radio system 100 and keep it powered on. For example, radio system 100 can be embedded within another device such as a printer, power strip, home appliance, WiFi router, etc. Such a radio system can be a "set and forget" type of system, requiring minimal maintenance and configuration from the host.

In some embodiments, radio systems 100 are strategically sent to hosts in areas where there is limited wireless availability or the current wireless infrastructure is at capacity. In some embodiments, the radio systems 100 are sent to places that are anticipated to have increased future demand or otherwise have an anticipated need.

After radio system 100 is powered on at a location, a central control server can connect to radio system 100. The central control server can then send configuration data to radio system 100. Configuration data can include broadcast frequencies, broadcast power, connection information (e.g., to connect to another network), etc. During or after initialization, central control server can configure or reconfigure radio system 100 according to various needs. For example, a person may desire wireless coverage of a certain type in a certain geographical area during a certain time and central control server can configure radio systems 100 within the area according to the current needs. In this manner, central control server can make radio systems 100 available for various users in a dynamic and need-based way. This enables the company that manages the radio systems 100 and the central control server to be a provider of "Radio Availability as a Service" (RAaaS) for customers wanting wireless availability in certain areas.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

FIG. 1 depicts an example radio system 100. In some embodiments, radio system 100 includes processor 102, GPS 104, memory 106, sensors 108, radio 110, power component 114 and wired networking interface 116. Processor 102 can coordinate data transfer between various components of radio system 100.

GPS 104 can interpret data from GPS (or similar) satellites to determine radio system 100's position. Because GPS 104 can draw a large amount of power, radio system 100 can also rely on other techniques to determine radio system 100's position. For example, radio system 100 can learn its location for a neighboring device; it can also detect nearby wireless signals and, using a database containing the origination location of the nearby wireless signals, triangulate its position. In some embodiments, radio system 100 is sent (for example, by the company running the RAaaS) to a predetermined location and, before transit, radio system 100 is programmed with its destination location. Radio system 100 can also only use GPS 104 periodically to conserve power.

Radio system 100 can gain environmental awareness using sensors 108. Sensors can include accelerometer(s), gyro(s), ambient light sensors, a button, a camera, barometer, pressure sensor, etc. In some embodiments, sensors 108 can detect persons within the vicinity. In some embodiments, radio system 100 can learn environmental information (location, orientation, etc.) from a neighboring device.

Radio 110 can send and receive 802.11x (WiFi), FM/AM, NFC, bluetooth, pager, etc. signals. In some embodiments, radio 110 is manufactured specifically for one signal. Alternatively, radio 110 can be reconfigured during operation, for example, it could interpret WiFi signals and then reconfigure for signals of a different frequency. In some embodiments, radio 110 is a software defined radio (SDR). An SDR is a type of radio that can send/receive signals over a spectrum of frequencies simultaneously. In some embodiments, radio 110 can include a combination of antennas (and corresponding transceivers) for various benefits. For example, multiple antennas can use precoding or beamforming to increase the gain of the signal at a receiver's location or multiple antennas can use spatial multiplexing for greater throughput. Multiple antennas can also be operating on diverse frequencies. For example, one antenna can be transmitting AM/FM signals while another operates at higher frequencies (e.g., 2.4 ghz). In some embodiments, multiple protocols that share the same frequency such as Bluetooth, WiFi, and ZigBee can share an antenna and can operate simultaneously. Thus configured, radio 110 can transmit and receive signals simultaneously with various devices over a large spread of frequencies and protocols. Radio system 100 also can broadcast or advertise multiple wireless signatures simultaneously (e.g., BSSID, SSID, MAC address, cell tower ID). In some embodiments, radio 110 has a directional antenna, providing increased power along a certain vector, plane, or region. In some embodiments, radio system 100 can include multiple radios 100. The multiple radios 100 can be configured for different frequencies, channels, protocols, clients, etc.

Power component 114 can be an internal power source such as a battery or capacity, an external power source, or a combination of the two. In some embodiments, power component 114 harvests wireless radiation energy for radio system 100's operation. In some embodiments, wireless radiation energy emanates from a power emitter that is separate from radio system 100 to be captured by power component 114. Alternatively, radio system 100 can harvest wireless radiation energy that is ambient electromagnetic energy. In some embodiments, power component 114 provides radio 110 functionality. For example, power component 114 can be connected to a building's electrical network and the wire of the building's electrical network can serve as an antenna for radio system 100. In some embodiments, power component 114 can supply power to external devices as well. For example, radio system 100 can act as a standard "power strip" as described below.

In some embodiments, wired networking interface 116 provides a physical connection to a network. For example, wired networking interface 116 can connect over Ethernet (e.g., IEEE 802.3), cable (e.g., DOCSIS), fiber, telephone, power-line communication, etc. Wired networking interface 116 can connect to an internet backbone for wide area communication. In some embodiments, radio system 100 receives configuration information over wired networking interface 116; this configuration information can include radio 110 settings, frequencies, and protocols. In some embodiments, radio system 100 serves as a wireless base station or access point—providing internet gateway services to clients to radio system 100 connected via radio 110.

Figure 2:
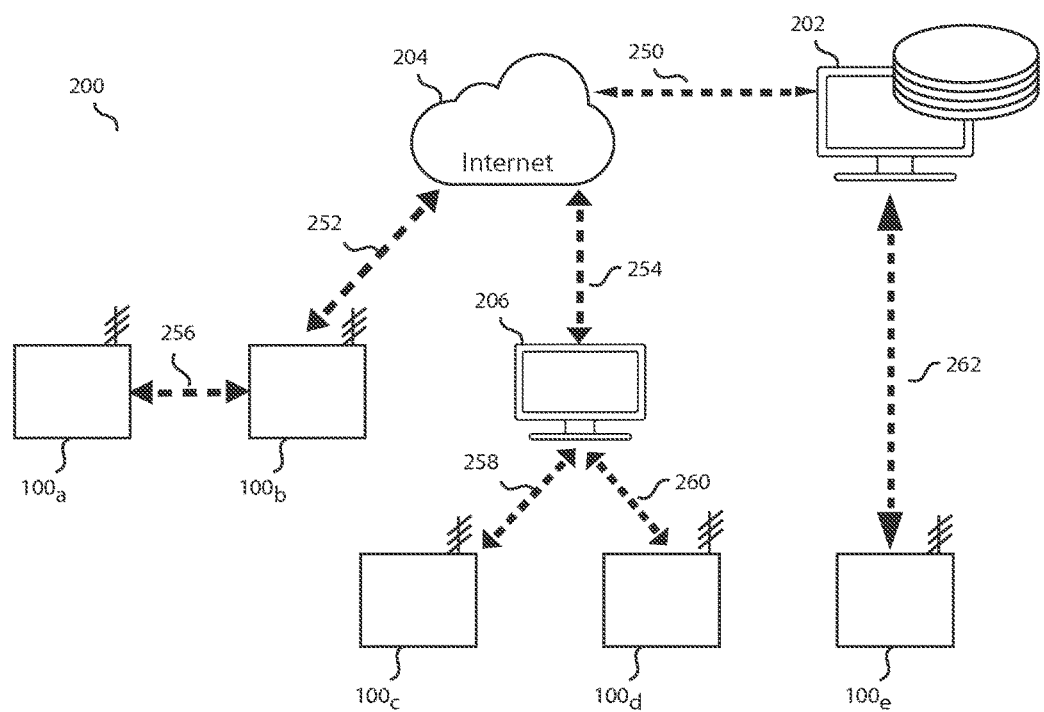
FIG. 2 shows various example connections and networks using radio system.

FIG. 2 shows various example connections and networks using radio system 100. Radio system 100 can communicate with configuration server 202 by various means, shown with radio systems $100_a$-$100_e$ and communication links 250-263. Each of example radio systems $100_a$-$100_e$ represents various network placements of radio system 100. For example, example radio system $100_e$ can directly communicate to configuration server 202. Alternatively, radio system 100 can connect by way of the internet 204, as is done with example radio systems $100_a$-$100_d$. In some embodiments, example radio system $100_a$ can connect directly to radio system $100_b$ which then communicates with configuration server 202, either through internet 204 or other means.

In some embodiments, radio system 100 can connect to backhaul server 206 as depicted with example radio systems $100_c$ and $100_d$. Backhaul server 206 can thus communicate with configuration server 202 and configure example radio systems $100_c$ and $100_d$ according to the communication. In some embodiments, configuration server 202 is connected to or runs a configuration administrator platform that can manage the customers that request RAaaS. For example, the configuration administrator platform can receive requests, balance priorities, facilitate automatic or manual bidding for resources, manage billing, detect and orchestrate repairs to radio systems 100 and the network infrastructure, and start and stop services as needed. In some embodiments, radio systems $100_c$ and $100_d$ have limited computational, storage, power, or bandwidth capabilities in comparison to backhaul server 206. In some such embodiments, backhaul server 206 can supplement the capabilities of radio systems $100_c$ and $100_d$. For example, backhaul server 206 can process data received on radio systems $100_c$ and $100_d$. Another example includes backhaul server 206 containing data that is accessible to client machines via radio systems $100_c$ and $100_d$, thus establishing radio systems $100_c$ and $100_d$ as wireless interfaces to backhaul server 206. For example, if radio systems $100_c$ and $100_d$ were positioned in a sports arena, backhaul server 206 can store instant replays of the event in memory; client devices can then access the instant replays via radio systems $100_c$ and $100_d$, avoiding any need for clients to communicate across the internet to other servers. Backhaul server 206 can be a virtual machine or physical system. Although two radio systems $100_c$ and $100_d$ are depicted as being connected to backhaul server 206, more or fewer radio systems can be connected. In some embodiments, backhaul server 206 provides wireless or direct power to radio systems $100_c$ and $100_d$.

Connections 250-262 can be established through various means known in the art. For example, they can be wireless or wired, secured or unsecured, continuous or on-demand, or any combination of the foregoing. Connections 250-262 represent end-points in a communication, it should be understood that various intermediaries can facilitate the linkages represented by connections 250-262. In some embodiments, radio system 100 can opportunistically search out a connection (e.g., connections 250-262). For example, radio system 100 can detect an unsecured ("open") WiFi connection. Radio system can prioritize between various connections 250-262. In some embodiments, radio system 100 uses one connection to acquire configuration information about another connection. For example, radio system 100 can communicate over a low-bandwidth radio network to acquire authorization keys that can be used to connect to a high-speed wired network. In some embodiments, radio system 100 can utilize frequency hopping for a variety of purposes, for example, to find the best frequency or collection of frequencies (e.g., best signal to noise ratio) or to minimize radio interference that may come in random bursts in one channel. In some embodiments, radio system can utilize protocol hopping in addition to (or instead of) frequency hopping for a variety of purposes. For example, as bandwidth and signal strength demands change, radio system 100 and a connected device can hop between 4 g, Wi-Fi, Bluetooth, and NFC while still retaining interconnectivity. If one frequency or protocol becomes undesirably crowded, radio system 100 can attempt "hopping" to another frequency or protocol.

The principles herein disclosed can provide advantages within a cloud infrastructure. A cloud, in networking contexts, is a method and system that hides underlying complexities of the system. For example, a cloud storage solution presents a user with a certain amount of continuous available storage space, despite the fact that the storage may reside on multiple disks, machines, and networks. If one disk fails, a network engineer can repair the disk using a backup without needing to notify the user. The cloud therefore allows a user to interact with a simplified representation of resources while a separate entity maintains the underlying infrastructure.

The principles in this disclosure facilitate a cloud based radio system whereby a user can request a wireless resource on a certain frequency/band/channel, modulation technique, protocol, and geographical location/area. The user can also request a data connection between the wireless resource and other networked resources. For example, a user might have a preexisting cloud network infrastructure and the user might request a virtual machine be provisioned that will attach to physical wireless resources in a certain region. The underlying infrastructure of the machines, radio systems, and networking components, can be hidden from the user. In this way, radio system 100 can be presented as a "radio virtual machine." In some embodiments, radio system 100 has an "abstraction" layer whereby multiple virtual radio machines can be installed on one radio system 100 without one virtual radio machine interfering or detecting another virtual radio machine on the same host. Multiple radio systems 100 can be presented as a single entity to a user requesting the resource. Also, multiple radio systems 100 can be presented as a single entity to a client that connects with radio systems 100. Radio system 100 can have a secure tunnel with other network resources. The tunnel can be established by configuration server 202.

Figure 3:
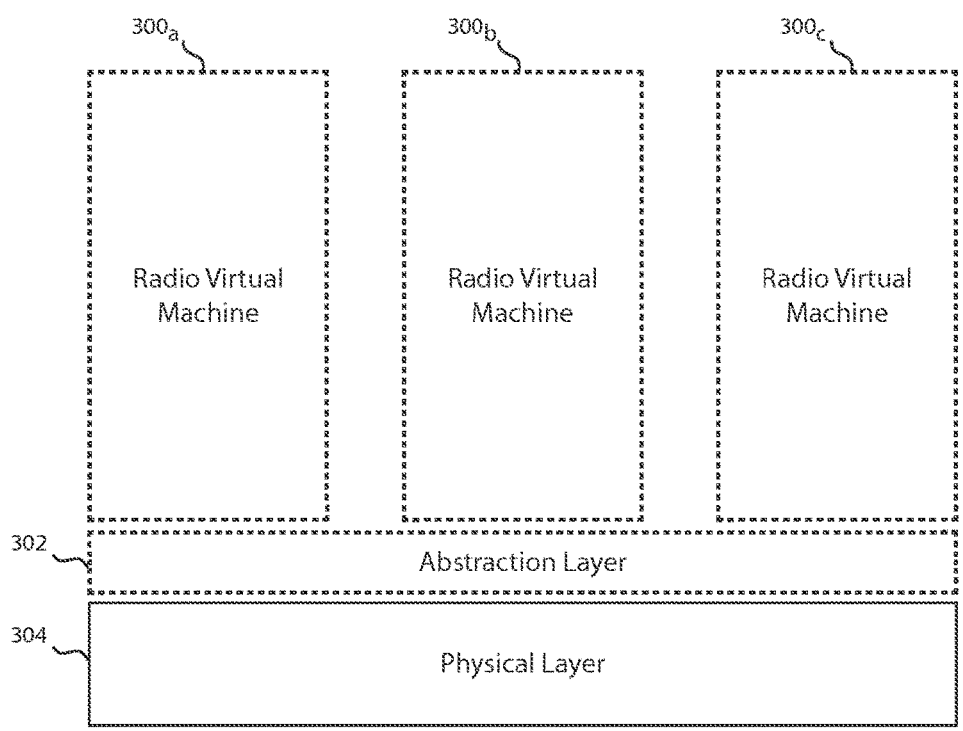
FIG. 3 shows various radio virtual machines operating on one physical layer.

FIG. 3 shows various radio virtual machines $300_a$-$300_c$ operating on one physical layer 304 (i.e., radio system 100). An abstraction layer 302 can manage the physical resources from the physical layer 304 and present virtual interfaces for the physical resources to radio virtual machines $300_a$-$300_c$. In some embodiments, radio virtual machines $300_a$-$300_c$ are associated with different users and are isolated from one another. For example, radio system 100 can service one client using one radio virtual machine 300 and service another client using another radio virtual machine 300. In some embodiments, each of these radio virtual machines can operate on using separate radios, frequencies, protocols, etc.

Figure 4:
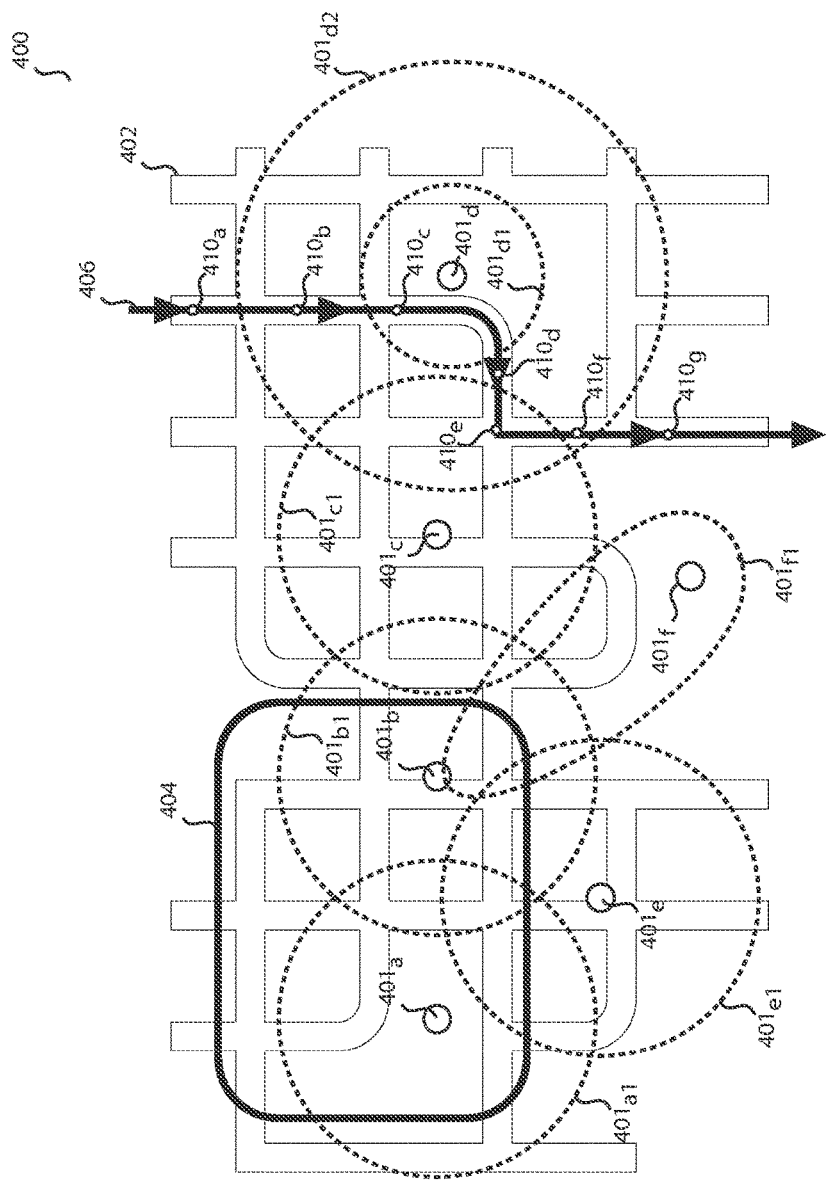
FIG. 4 shows various radio systems positioned throughout example city layout.

FIG. 4 shows various radio systems $401_a$-$401_f$ positioned throughout example city layout 402. Radio systems $401_a$-$401_f$ can be various example embodiments of radio system 100. Traditionally, radio emitter placement within a city can become a complex ordeal, requiring skilled network engineers to configure and place with meticulous precision. Interference, coverage, power, and cost constraints increase the complexity of provisioning a static system.

The principles disclosed herein can be applicable to such static systems, yet applying these principles to dynamic systems can provide additional operational efficiencies. For example, configuration server 202 can determine that various radio systems such as radio systems $401_a$ and $401_b$ overlap in coverage; it can then lower the power output of one of the radio systems or change their carrier channel to avoid destructive interference. In some embodiments, configuration server 202 coordinates radio systems with overlapping signals such that an overlapping area creates constructive interference, increased throughput, or error correction. In some embodiments, configuration server 202 can dynamically allocate guard bands in order to minimize interference from channels that are close in frequency. Configuration server 202 can dynamically allocate subcarriers between radio systems. Configuration server 202 can also establish usage priorities and provide sharing algorithms that enable multiple radio systems $401_a$-$401_f$, protocols, and client devices share wireless spectrum.

In some embodiments, radio systems 100 can report on the wireless signals they detect from other radio systems 100. For example, radio system $401_b$ might detect a signal from radio system $401_a$. Radio system $401_b$ can then report on the quality of the signal to configuration server 202. For example, radio system $401_b$ can report that the signal is subject to a certain degree of noise, contains reflections (similar to an acoustic echo), or other descriptive qualities known in the art. Configuration server 202 can then diagnose any problems with the current configuration of radio system $401_a$ and further configure radio system $401_a$ to overcome the problems. For example, configuration server 202 can configure radio system $401_a$ to speed up/slow down its clock, change frequencies, change power output, etc. With data from various radio systems, configuration server 202 can minimize conflicts between radio systems.

Radio coverage can be provided in region 404. For example, a trade convention might take place within region 404 and the organizers of the convention can request WiFi coverage within region 404 that bears the conference name (e.g., "Conference WiFi"). In some embodiments, all radio systems within region 404 can be configured to provide radio coverage (e.g., radio system $401_a$ and radio system $401_b$); alternatively, radio systems that can cover region 404 can be configured to provide radio coverage (e.g., radio system $401_a$, radio system $401_b$, radio system $401_f$, and radio system $401_e$). In some embodiments, radio systems $401_a$-$401_f$ estimate their coverage region $401_{a1}$-$401_{d1}$, and $401_{d2}$. In some embodiments, configuration server 202 estimates the respective coverage regions $401_{a1}$-$401_{d1}$, and $401_{d2}$. These estimations can be calculated based on power output and frequency noise as well as historical coverage regions (i.e., a record of the location of devices that have been able to connect with each radio system $401_a$-$401_f$).

In some embodiments, the location of radio system 100 can be determined using GPS module 104 in radio system 100. Alternatively, the location can be determined using other data such as sunrise/sunset, nearby wireless signatures that have known locations (e.g., detecting a cell tower ID and looking up its location in a database), or based on where radio system 100 was installed. Radio system 100 can make this location determination itself or configuration server 202 can assist in making this determination. In some embodiments, after detecting its location (whether by using GPS module 104, detecting nearby wireless signals of known origin, or other means) radio system 100 can communicate its location to other devices (e.g., other radio systems and/or client devices).

Example radio system $401_f$ shows how radio system 100 can configure its coverage region $401_{f1}$ to cover a certain area within region 404. Coverage region $401_{f1}$ depicts a possible directed region, i.e., it sacrifices coverage in some areas and enhances coverage in others. This can be accomplished through beam forwarding or physically changing the direction of an antenna or a reflector. Example radio system $401_d$ shows how radio system 100 can configure its coverage region to be smaller (coverage region $401_{d1}$) or larger (coverage region $401_{d2}$). This can be accomplished by adjusting the power output of the radio. Configuration server 202 can instruct radio systems $401_a$-$401_f$ to adjust their coverage regions $401_{a1}$-$401_{d1}$, and $401_{d2}$. Alternatively, radio systems $401_a$-$401_f$ can adjust their coverage regions $401_{a1}$-$401_{d1}$, and $401_{d2}$ without instruction. It should be understood that coverage regions $401_{a1}$-$401_{d1}$, and $401_{d2}$ can be different for different frequencies, protocols, and networks. For example, coverage region $401_{d1}$ can correspond to a WiFi network with one SSID while coverage region $401_{d2}$ can correspond to a WiFi network with another SSID.

In some embodiments, the relative location of a connected device and radio systems $401_a$-$401_f$ might change over time. For example, example route 406 represents a possible path of a connected device as it passes through locations $410_a$-$410_g$. At location $410_a$, the connected device is not within any available coverage region. At location $410_b$, the connected device is within coverage region $401_{d2}$. As the connected device moves to location $410_c$, radio system $401_d$ can decrease power so that it covers coverage region $401_{d1}$ and similarly increase power when the connected device moves to location $410_d$. As the connected device moves to location $410_e$, it will be within coverage region $401_{d2}$ and coverage region $401_{c1}$. In some embodiments, example route 406 can represent a connected device moving (e.g., a person driving through a city or walking around a building while carrying the connected device). Alternatively, example route 406 can represent radio systems $401_a$-$401_f$ moving (e.g., attached to aerial balloons), or movement of both the connected device and the radio systems $401_a$-$401_f$.

In position $410_e$, the connected device can be within coverage region $401_{c1}$ and $401_{d2}$. In some embodiments, the connected device will have two active connections, one with radio system $401_c$ and another with radio system $401_d$. These active connections can be on different radio frequencies. Data that is to be received by the connected device can pass through the either connection or both. Alternatively, radio systems $401_c$ and $401_d$ can both facilitate the connection by sending data so that it arrives at position $410_e$ simultaneously and with constructive interference; in some such embodiments, the connected device can be ignorant of the duplicative radio systems. Alternatively, configuration server 202 can facilitate a "hand-off" between radio system $401_c$ and $401_d$. For example, connected device can establish a session with an internet resource via radio system $401_d$ and configuration server 202; once connected device is at position $410_e$, configuration server 202 can determine that a hand-off should occur and instructs radio $401_c$ to connect with connected device; and configuration server can begin routing the session data through radio system $401_c$. Determining a hand-off should occur can be based on a variety of factors. For example, configuration server 202 can instruct newly discovered radio systems to always take the connection, it can have the radio system with the strongest signal maintain the connection, or it can predict what radio system's signal may drop and establish the connection through the other radio system.

Figure 5B:
FIG. 5A and FIG. 5B depict example radio system embodiments.
Figure 5A:
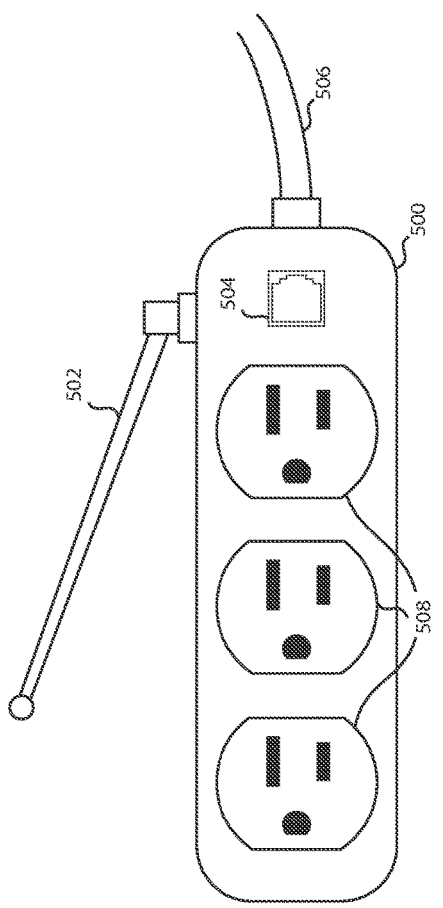

FIG. 5A and FIG. 5B depict example radio system 100 embodiments. For example, power strip 500 can house the components of radio system 100 as well as various other components. For example, power strip 500 can have power cable 506 that can be plugged into the wall for power and also have power outlets to provide power for other devices and appliances. Additionally, power strip 500 can have antenna 502 connected to radio 110 of radio system 100 as well as Ethernet plug 504 for wired networking interface 116. In some embodiments, Ethernet plug 504 can be connected to a router for network (e.g., internet) access; alternatively, power strip 500 can gain network access via power cable 506.

FIG. 5B depicts an example radio system 100 embodiment. For example, radio tower 550 can comprise controller 560 which can house some components of radio system 100 (e.g., processor 102, memory 106, wired networking interface 116, power 114, etc.). WiFi antenna 558, cellular antenna 556, directional antenna 554, and TV antenna 552 can all facilitate connections on various frequencies and with various power outputs. In some embodiments, directional antenna 554 is configured to establish a dedicated connection with another radio tower 550, an orbiting satellite constellation, configuration server 202, etc. Solar panel 562 can provide power to controller 560 and the other components on radio tower 550.

In some embodiments, radio tower 550 can be placed in remote locations to provide wireless connectivity where running wires is not cost effective. For example, radio tower 550 can be placed (discretely) near a beautiful vista at the end of a mountain hike. This can enable a hiker to connect to the internet and send a picture that they just took at the location. A radio tower 550 placed in remote locations can also provide cellular coverage for cellular users to connect with emergency personnel in case of an accident. In some embodiments, radio tower 550 can be mobile and can be placed where a temporary and unmet demand is present, for example for a sporting event or a disaster area where the present infrastructure might be damaged or at capacity.

Figure 6A:
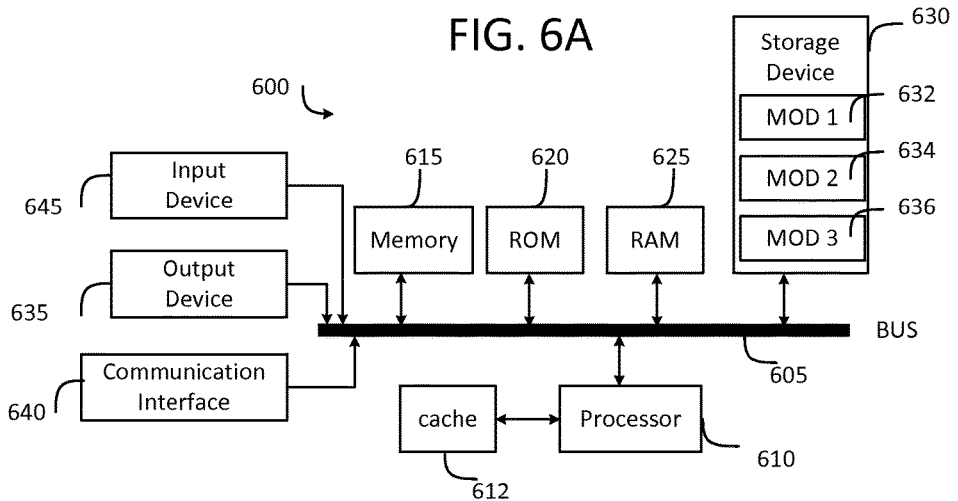
FIG. 6A, and FIG. 6B illustrate example possible system embodiments.
Figure 6B:
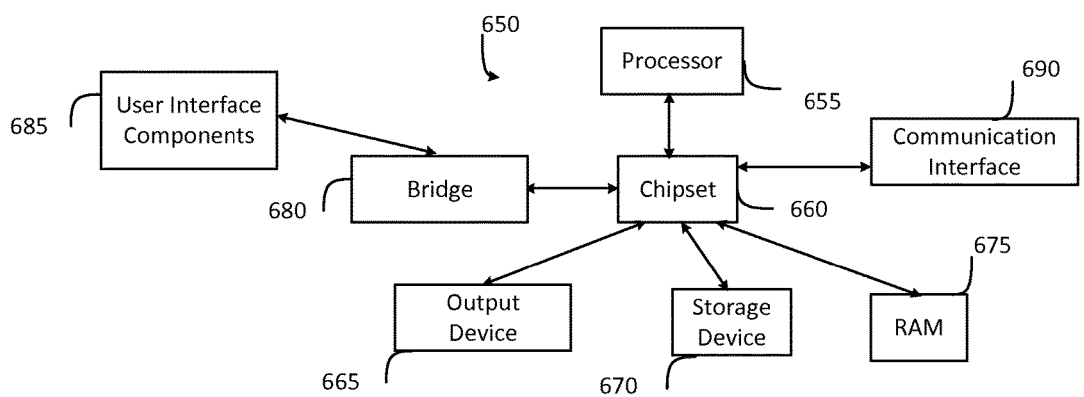

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 670 and random access memory (RAM) 675, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 637, module 7 634, and module 3 636 stored in storage device 630, configured to control the processor 910 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 675, read only memory (ROM) 670, and hybrids thereof.

The storage device 630 can include software modules 637, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A system comprising:
a device embedded in the system, the device comprising:
a processor;
a radio;
a memory containing instructions that, when executed by the processor, enable the device to:
determine the device's location within a specific area responsive to the device being within the specific area;
configure, in response to the device being within the specific area, a first antenna coupled to the radio to send and receive data over a wireless link;
send information, to a server, related to the device's location via the first antenna over the wireless link;
receive, from the server, configuration data over the wireless link, the configuration data created in response to the device's location being within the specific area and created based on the device's location being within the specific area;
configure, in response to the device's location being within the specific area and based on the device's location being within the specific area, a second antenna coupled to the radio to send and receive data over a short-range wireless network using the configuration data; and
receive, via the second antenna over the short-range wireless network, data from one or more connected devices, the data including locations of the one or more connected devices in proximity to the device's location estimated by the one or more connected devices.

2. The system of claim 1, further comprising at least one power outlet capable of delivering power to an external device.

3. The system of claim 1, wherein the radio is a software defined radio.

4. The system of claim 1, wherein the device further comprising a GPS receiver wherein the determining of the device's location uses the GPS receiver.

5. The system of claim 1, wherein the determining of the device's location comprises:
identifying a nearby wireless transmitting device with a known location; and
estimate the device's location based on the signal strength and known location of the nearby wireless transmitting device.

6. The system of claim 1 wherein the instructions, when executed by the processor, further enable the device to:
establish a secure tunnel with a cloud over the wireless link;
receive a file from the cloud over the secure tunnel;
store the file in the memory;
receive a request from the one or more connected device for the file; and
send the file to a connected device of the one or more connected devices using the short-range wireless network.

7. The system of claim 6, wherein the file is a media file related to a sporting event.

8. The system of claim 1, wherein the second antenna of the radio is configured to operate on one or more WiFi frequencies.

9. The system of claim 1, wherein the configuration data at least includes one of broadcast frequencies, broadcast power, or connection information.

10. The system of claim 1, wherein the instructions, when executed by the processor, further enable the device to:
    receive, from the server, new configuration data over the wireless link;
        reconfigure the second antenna of the radio to operate on an FM frequency using the new configuration data; and
    broadcast data to over the FM frequency.

11. The system of claim 1, wherein the system is a power strip.

12. The system of claim 1, wherein the system is a printer.

13. The system of claim 1, further comprising instructions which when executed by the processor cause the device to:
    receive, from a server, instruction to adjust a coverage region of the short-range wireless network; and
    adjusting power output of the second antenna for the coverage region.

14. The system of claim 13, wherein when the adjusted coverage region is greater than the coverage region, the power output is increased.

15. The system of claim 13, wherein when the adjusted coverage region is less than the coverage region, the power output is decreased.

16. The system of claim 1, wherein the system is a home appliance.

\* \* \* \* \*